United States Patent
Chan et al.

(10) Patent No.: US 10,620,806 B2
(45) Date of Patent: Apr. 14, 2020

(54) USING IMAGE UNDERSTANDING TO ASSIST USER ENGAGEMENT

(71) Applicant: Microsoft Technology Licensing, LLC, Redmond, WA (US)

(72) Inventors: Chunkit Jacky Chan, Kirkland, WA (US); Ankur Khator, Sammamish, WA (US); Jenny Linnéa Maria Ahlbäck, Bjarred (SE); Jasmina S. Mathieu, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/987,855

(22) Filed: May 23, 2018

(65) Prior Publication Data

US 2019/0361590 A1    Nov. 28, 2019

(51) Int. Cl.
| | | |
|---|---|---|
| *G06F 3/048* | (2013.01) | |
| *G06F 3/0484* | (2013.01) | |
| *G06K 9/00* | (2006.01) | |
| *G06F 3/0481* | (2013.01) | |
| *G06K 9/62* | (2006.01) | |
| *G06F 16/54* | (2019.01) | |

(Continued)

(52) U.S. Cl.
CPC ........ *G06F 3/04842* (2013.01); *G06F 3/0481* (2013.01); *G06F 16/54* (2019.01); *G06F 16/5838* (2019.01); *G06K 9/00671* (2013.01); *G06K 9/623* (2013.01); *G06T 11/60* (2013.01)

(58) Field of Classification Search
CPC ............. G06F 3/04842; G06F 16/5838; G06F 16/532; G06F 3/0488; G06F 3/04817; G06F 3/04845; G06F 3/14; G06F 16/583; G06F 3/0482; G06F 3/1204; G06F 16/51; G06F 16/54; G06F 16/5854; G06F 16/5866; G06F 16/93; G06F 21/36; G06F 2203/04806

See application file for complete search history.

(56) References Cited

U.S. PATENT DOCUMENTS

| | | |
|---|---|---|
| 5,075,787 A | 12/1991 | Shaughnessy et al. |
| 9,031,281 B2 | 5/2015 | Buch et al. |
| | (Continued) | |

OTHER PUBLICATIONS

"International Search Report and Written Opinion Issued in PCT Application No. PCT/US2019/032071", dated Jul. 25, 2019, 10 Pages.

*Primary Examiner* — Di Xiao (57) ABSTRACT

Embodiments relate to leveraging automated image understanding to foster user engagement with an image. An image viewer application is provided with image analysis algorithms that determine features of an image by identifying objects in the image, recognizing faces in the image, etc. Hotspots may be added to the display of the image at locations of the features. Contextual metadata such as data about a user, user activity, other images, etc. can be used to determine which features will be provided with hotspots and what information will be associated with the hotspots. In one embodiment, the information associated with a hotspot is another image, and interactive selection of the hotspot causes the image to be both displayed and processed for hotspot augmentation. Tools may be provided to modify or edit the image based on the features found via the image analysis.

18 Claims, 7 Drawing Sheets

(51) Int. Cl.
*G06F 16/583* (2019.01)
*G06T 11/60* (2006.01)

(56) References Cited

U.S. PATENT DOCUMENTS

| | | |
|---|---|---|
| 9,042,640 B2 | 5/2015 | Bala et al. |
| 9,171,374 B2 | 10/2015 | Tadmor |
| 9,251,580 B2 | 2/2016 | Nykyforov |
| 9,692,964 B2 | 6/2017 | Steinberg et al. |
| 2009/0288019 A1 | 11/2009 | Tunning |
| 2012/0167145 A1* | 6/2012 | Incorvia ............. H04N 21/4725 |
| | | 725/60 |
| 2013/0294642 A1 | 11/2013 | Wang et al. |
| 2013/0332068 A1 | 12/2013 | Kesar et al. |
| 2015/0134688 A1* | 5/2015 | Jing ...................... G06F 3/0482 |
| | | 707/766 |
| 2016/0062961 A1 | 3/2016 | Zhu et al. |
| 2016/0179845 A1 | 6/2016 | Nguyen et al. |
| 2017/0024614 A1 | 1/2017 | Sanil et al. |
| 2017/0064206 A1* | 3/2017 | Ku ...................... H04M 1/0264 |

\* cited by examiner

USING IMAGE UNDERSTANDING TO ASSIST USER ENGAGEMENT

BACKGROUND

Viewing photos is a common task for users of computing devices. Viewing an image might trigger multiple thoughts for the user, for instance, what happened on the day an image being viewed was taken, memories of a location or persons portrayed in a viewed image, how can a viewed image be enhanced, and so forth. With previous image viewing software, the onus has been on the user to act on these kinds of thoughts. The user has had to take manual action to find related images in their collection, for instance searching explicitly using keywords, perhaps repeating the same action several times until desired images are found. Previous image viewing experiences have not given a natural entry point to image-related information that starts from the photo viewing experience. Although techniques for finding and displaying images related to a viewed image have been implemented, they have not allowed the image surface to function as an entry point to related images.

SUMMARY

The following summary is included only to introduce some concepts discussed in the Detailed Description below. This summary is not comprehensive and is not intended to delineate the scope of the claimed subject matter, which is set forth by the claims presented at the end.

Embodiments relate to leveraging automated image understanding to foster user engagement with an image. An image viewer application is provided with image analysis algorithms that determine features of an image by identifying objects in the image, recognizing faces in the image, etc. Hotspots may be added to the display of the image at locations of the features. Contextual metadata such as data about a user, user activity, other images, etc. can be used to determine which features will be provided with hotspots and what information will be associated with the hotspots. In one embodiment, the information associated with a hotspot is another image, and interactive selection of the hotspot causes the image to be both displayed and processed for hotspot augmentation. Tools may be provided to modify or edit the image based on the features found via the image analysis. In another embodiment, edits or operations such as pasting graphics (e.g., decals or stickers) are anchored to the features of the image. The graphics may be made available based on information about the image and/or contextual metadata that personalizes the user engagement with the image.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Figure 1:
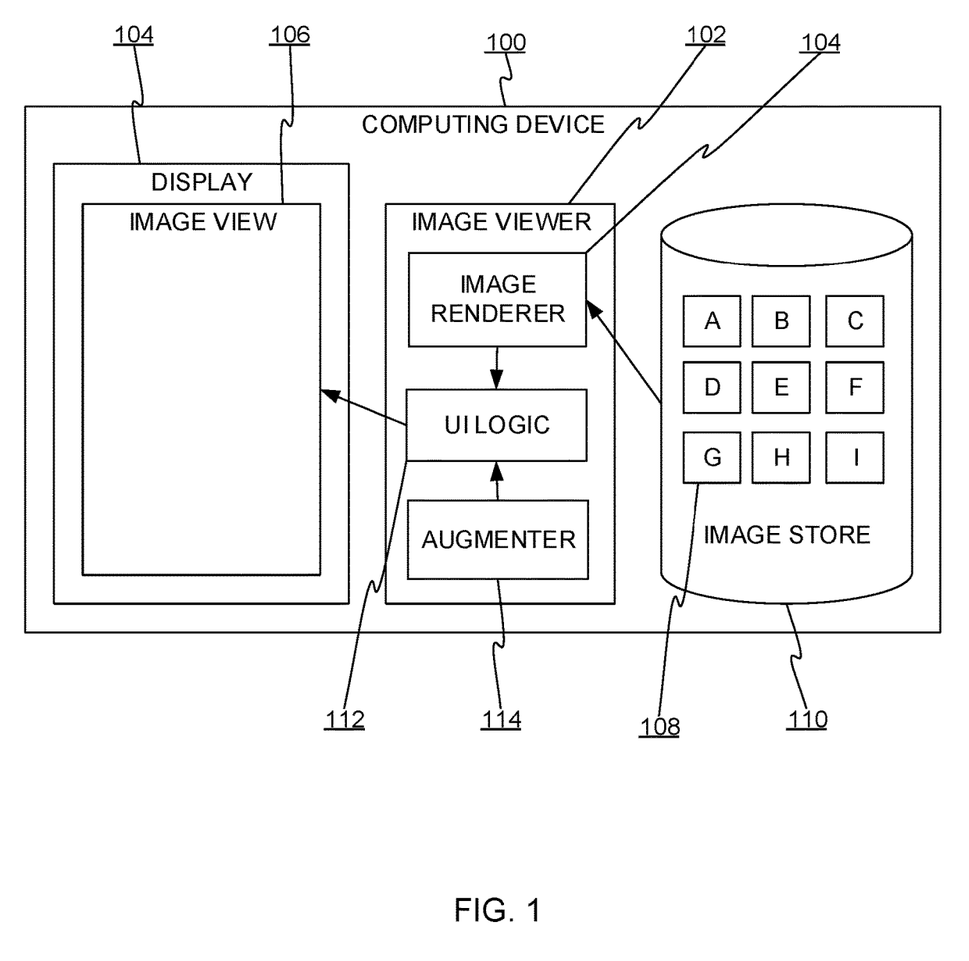
FIG. 1 shows a computing device configured with an image viewer.

FIG. 1 shows a computing device 100 configured with an image viewer 102. The image viewer 102 is an application that runs on the computing device 100. The image viewer 102 may be installed to an operating system of the computing device 100 and executed as native code, executed by a just-in-time compiler (e.g., in a network browser), etc. The image viewer 102 includes an image renderer 104 for rending various image formats. The image renderer 104 may implement decoding algorithms or may be an interface to a system rendering service that decodes images. The image renderer 104 renders an image that the image viewer 102 has opened from a local file, an image passed to the image renderer 102, or otherwise. Some devices may have an image store 110 where images 108 are stored locally. The computing device 100 includes a display 104 on which the image viewer 102 displays, in an image view area 106, the image currently rendered by the image renderer 104.

The image viewer 102 may access images 108 in an image store 110. The image store 110 may be stored locally and/or accessed from a network service. The images 108 may be files that conform to any of the many known image formats and encoding standards.

The image viewer 102 may include UI logic 112 and an augmenter 114. The UI logic 112 handles user input, windowing events, and outputting graphics to the image view area 106. The UI logic 112 may include means for allowing a current image to be selected for viewing, image editing tools, sharing tools, etc. As discussed below, the UI logic 112 may be instructed by the augmenter 114 to add UI elements to the image currently being displayed in the image view area 106.

As expanded upon below, the augmenter 114 uses image processing algorithms to obtain information about objects in the currently displayed image 108. The augmenter 114 then decides which objects are to be augmented with additional UI features, for instance hotspots, and which information is to be accessible from the augmenting UI features.

Figure 2:
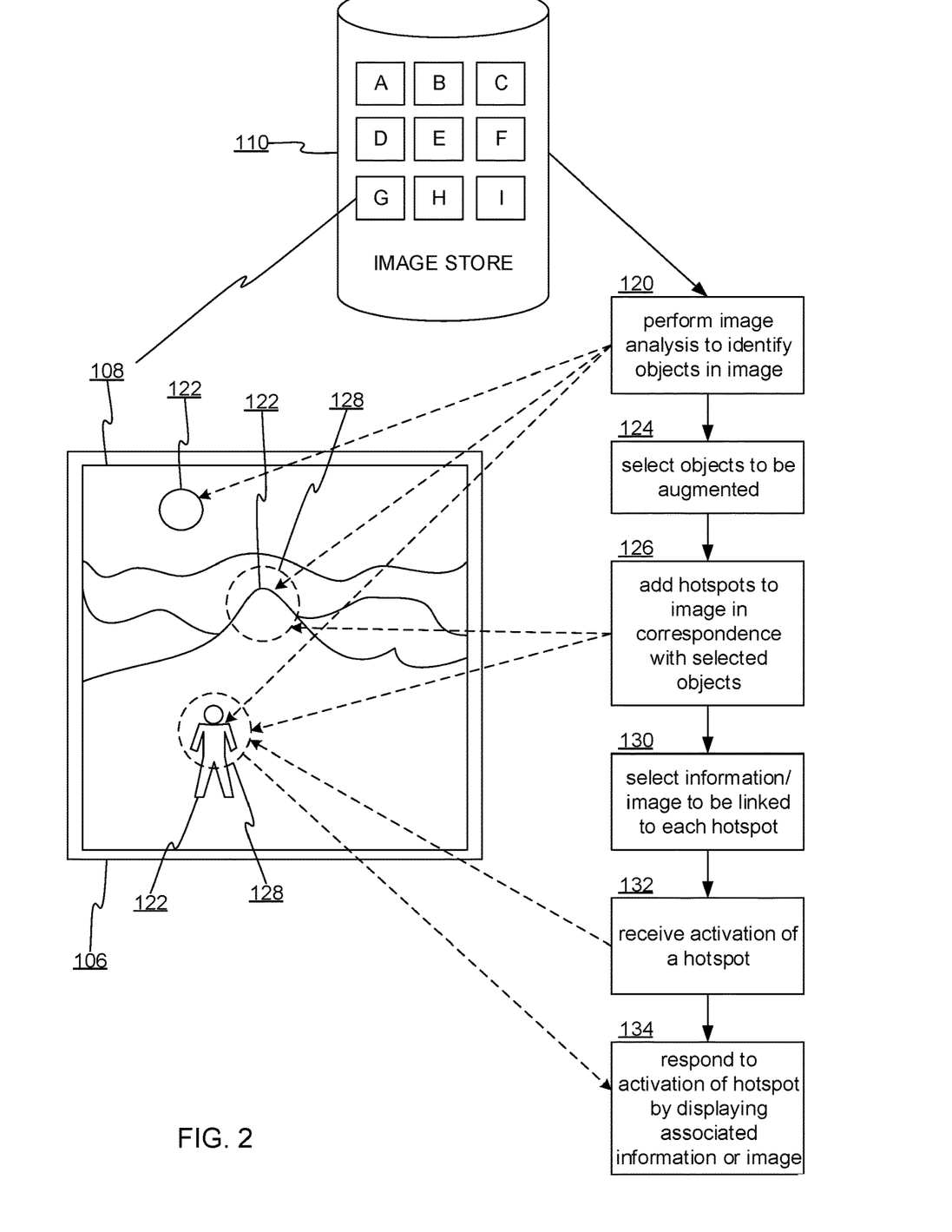
FIG. 2 shows a process performed by the augmenter of the image viewer.

FIG. 2 shows a process performed by the augmenter 114 of the image viewer 102. As noted above, the image viewer has a changeable current image that is whichever of the images 108 has been selected, rendered, and is currently being displayed in the view area 106. The steps shown in FIG. 2 may be performed whenever a new image is selected to be the current image, upon an explicit invocation of an element of the image viewer's UI, etc.

At step 120, image analysis is performed on the image 108 to identify objects in the image. The image analysis may be any of a variety of known image processing algorithms. The image analysis may perform background/foreground separation, object segmentation, object identification, face detection, face recognition, etc. Object and face recognition may be performed with trained learning machines. The image analysis may also apply machine learning algorithms to infer traits or metadata of the current image 108, such as a season during which the image was captured, the image's geographic location, a three-dimensional pose (position and direction) of the image in a three-dimensional reconstruction of a vicinity in which the image was captured, etc. The image analysis algorithms may be implemented on the local computing device 100 and/or at a network service using network application programming interfaces (APIs).

Notably, the image analysis step 120 may identify objects 122 in the current image 108 as well as locations in the image of their respective graphics. In the example shown in FIG. 2, identified and recognized objects 122 include the sun, a mountain peak, and a person. Any type of object may be recognized and located in the image.

At step 124 the recognized objects are processed to select which ones will be targets for UI augmentation. Different factors may be used to determine which objects will be selected for UI augmentation. One approach is to compute a score for each object and select the objects according to their relative scores, perhaps limited by density (how many objects in a certain area). Another approach is to apply a set of user-adjusted filters that specify which kinds of objects are preferred. Yet another approach is to estimate relevances of the objects to external criteria such as a task at hand, a context from which the image or image viewer was invoked, traits of the user, image viewing history, predominant traits of a subset of other images or images in the image store 110, etc. Details of object selection are set forth further below. In sum, not all recognized objects will anchor UI augmentation, and the objects that are to serve as such anchors can be selected based on many conditions.

At step 126 the user interface of the image view area 106 is augmented with UI elements such as hotspots 128. The hotspots 128 may be placed in the image view area 106 according to the previously identified locations, in the image, of the objects selected at step 124. In the example shown in FIG. 2, the mountain peak and person objects have been selected for augmentation and hotspots 128 are located accordingly.

The hotspots 128 may be outlines or patches of ordinary geometric shapes, each possibly scaled according the scale of its object. In one embodiment, the hotspots 128 may be have a shape congruous to the shape of the respective objects. The hotspots 128 may be alpha-blended with the graphics of their respective objects. In one embodiment, the hotspots 128 are only displayed some of the time. For example, hotspots may be temporarily displayed when added to the image view area or when a pointer moves in the image view area or hovers over or near a hotspot 128. The hotspots 128 may gradually fade to be fully transparent in response to lack of user activity. Different schemes may be used to minimize occlusion of the underlying image. Hotspots 128 may also be implemented as alterations (e.g., highlights) to the graphics of the respective objects. In any case, the hotspots 128 are configured to be activatable responsive to user inputs such as pointer clicks/touches, voice commands, etc.

At step 130 the augmenter selects the information that is to be linked to each hotspot 128. The information selected may depend on what information is available or accessible. Different approaches may be used for different types of information. In general, the objective is to identify the information that is best suited for each augmented object. That, in turn, may depend on the nature of the image viewer, the task the user is engaged in, the type of object, etc. In one embodiment, the information to be linked to the hotspots are other images in the image store 110 or elsewhere. In this embodiment, images may be selected for linking based on relevance to a corresponding object, degree of similarity to the object, a previously established relationship with the object, and so forth. The techniques discussed above for selecting the objects to be hotspotted may be used to select the information/images to be linked by the hotspots.

At step 132 the image viewer receives a message or event corresponding to activation of a hotspot 128 by a user input. The hotspot may or may not have been graphically displayed when activated. At step 134 the image viewer responds to the activation of the hotspot by displaying the information or image associated with the activated hotspot. In one embodiment, the associated information is an image and the image is displayed in the image view area 106 when the hotspot is activated. In another embodiment, the linked-to information may be an ink/decal graphic and activation of the hotspot edits the image to include the ink/decal. In yet another embodiment, the linked-to information is text related to the object of the activated hotspot and the text is added to the image.

Figure 3:
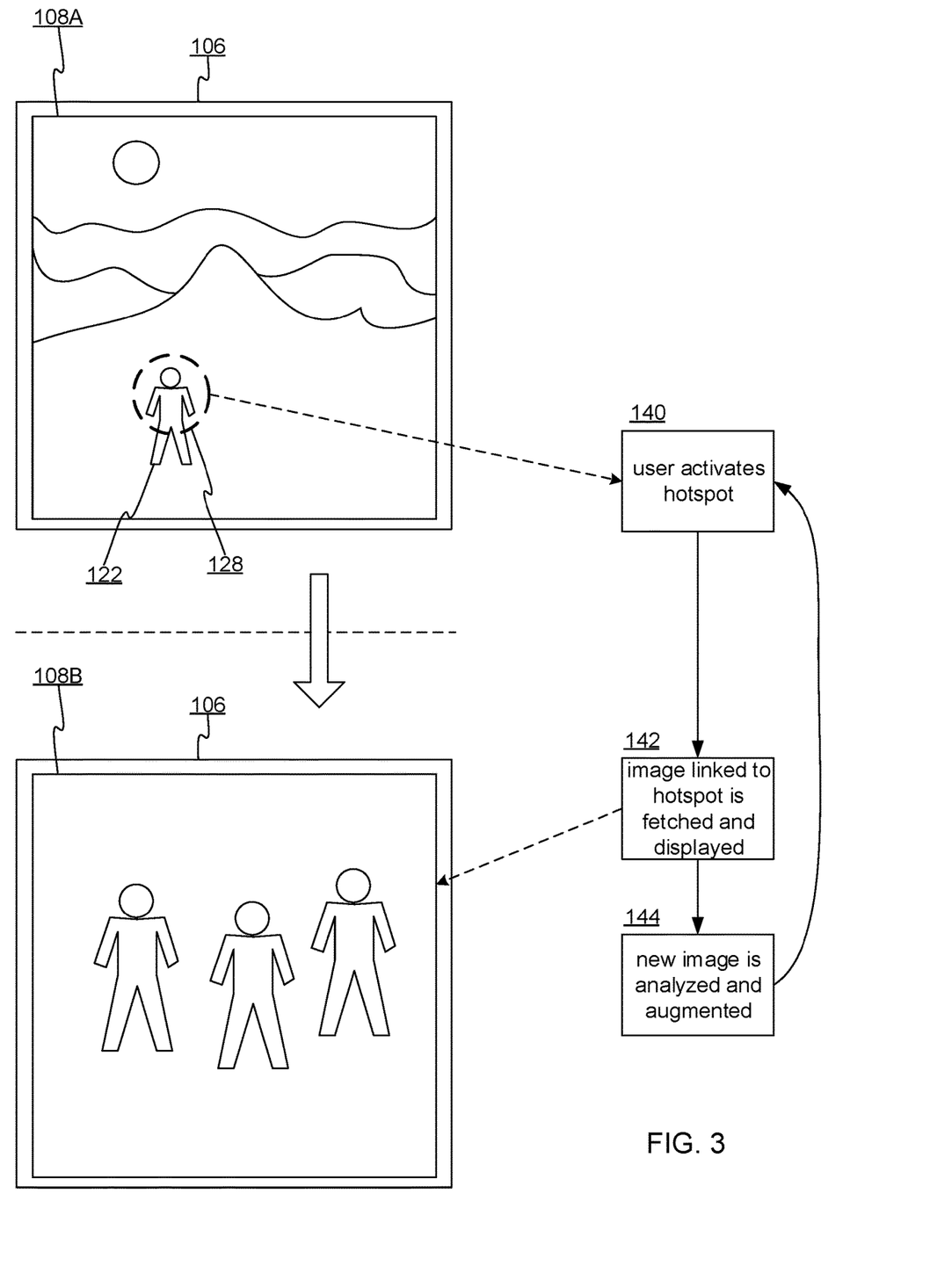
FIG. 3 shows how the image viewer can be used to recursively explore the images in an image store.

FIG. 3 shows how the image viewer can be used to recursively explore the images in the image store. It will be assumed that the current image 108A has been analyzed and augmented with a hotspot 128 for a recognized object 122, which is a person in this example. At step 140 the hotspot 128 is activated by a user input. In response, at step 142, the image 108B previously linked to the hotspot/object is loaded by the image viewer, decoded, and displayed. In this example, the linked-to image 108B was selected based on strength of a commonality with the object, namely, the object/person hotspotted in image 108A also appears in image 108B. Once the new image 108B has been loaded, at step 144 the augmentation process is applied to the new image 108B; image analysis is performed, hotspots and linked-to information are determined, and the hotspots are added to the image view area 106 where the new image 108B is displayed. With this recursive approach, a user can explore a set of images in a way that may correlate to the thoughts of the user. For instance, if the user is interested in an element of the currently displayed image the user can jump to another image related to that element with little effort and without having to divert attention away from the image viewer or the image view area 106.

Figure 4:
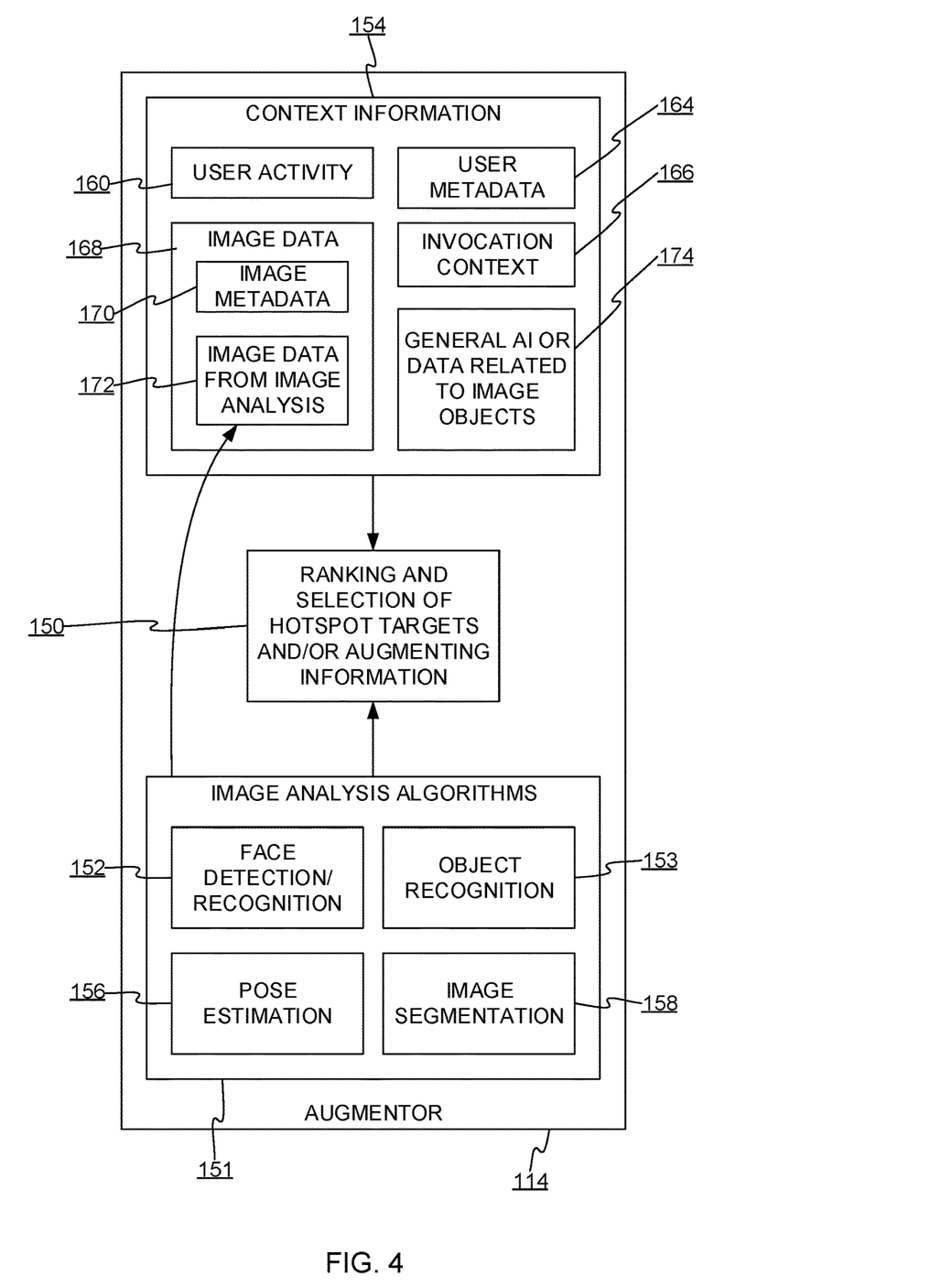
FIG. 4 shows techniques that can be used to select hotspot targets in an image and information linked to the hotspots.

FIG. 4 shows techniques that can be used to select hotspot targets in an image and the information linked to the hotspots. The augmenter 114 has a ranking module 150 that uses output from image analysis algorithms 151 and context information 154 to decide which objects will be equipped with hotspots and which information to link to the hotspots.

The image analysis algorithms 151 may provide information about the image currently displayed in the image view area 106 and/or about other images that are available for potential display by the image viewer. The image analysis algorithms 151 may include any known algorithms for parsing the content of images. For example, the algorithms may include a face detection and recognition algorithm 152, which detects the presences of faces in an image, and may recognize known faces if such information is available (for example, from images in the image store 110). An object recognition algorithm 153 may identify objects in an image and information about them such as the identity of an object (what the object is), properties of an object (e.g., details or metadata about the object), etc. A pose estimation algorithm 156 may also be employed to infer information about one or more persons in an image, where the body parts are (e.g., eyes, hands, etc.) in the image, and so forth. This information can be helpful for placing hotspots, and, as discussed below, adding graphics or edits to the current image. An image segmentation algorithm 158 may also be employed for separating foreground and background, for example. As noted, the outputs from the image analysis algorithms 151 may be provided to the ranking module 150. Outputs of the image analysis algorithms 151 may also be stored in metadata associated with images or stored in image files. This may occur when an image is loaded to the image viewer, when images are analyzed in the background, linked to a hotspot, etc.

The ranking module 150 may also use the context information 154 to rank or select objects that are to be hotspotted and/or to select the information that is to be associated with hotspots. The context information 154 may include user activity data 160. The user activity data 160 may comprise recent UI interactions by the user, counts or dates of image accesses, which applications are used most often, etc. The context information 154 may include user metadata 162, which is information about, and specific to, the user operating the image viewer. The user metadata 164 may include a user profile (e.g., a social network profile), user preferences, contacts of the user, and other personal information. The context information 154 might also include invocation context 166, which indicates context from which the currently displayed image was selected; a web page, a subset of images in the image store, an application, etc. Image data 168 about the images may also be included in the available context information 154. This includes typical image metadata 170 as well as image analysis data 172, which can be any information about images derived from the image analysis algorithms 151. Finally, the context information 154 may include general information 174 about the objects, perhaps provided machine learning algorithms or external knowledge bases.

The context and/or image data available to the augmenter 114 can be used in a variety of ways. A convenient technique is to form feature vectors for candidate images, objects, and the current image. The feature vectors can contain any of the types of information in the context information 154 or image information provided by the image analysis algorithms 151.

For scoring and selecting the objects (hereafter, "objects" also refers to faces) recognized in an image, the objects' feature vectors can be scored for objective relevance based on inherent traits, or they can be scored for relevance to the current image or context. Objective scores can be weighted sums of the features in the feature vectors, for example. Relevance scores can be computed using different vector-distance computations. In either case, the objects in an image are scored either independently (based on their inherent features) or as a function of their fit or relevance to the current image and/or the available context data. The scores of the objects can be used to select which objects will be augmented; a top-N set of objects may be selected, or the image may be broken down into regions and the top scored object in each region may be selected.

For determining which information or images are to be associated with the respective objects, feature vectors of the images can be evaluated against feature vectors of the objects and/or the current image. For each object, distances of the feature vectors of the candidate images from the feature vector of the object are computed and the candidate image with the closest feature vector is selected. Any vector distance measure may be used. The distance measure may be based in part on features of the current image. For example, features present in the current image may be given more weight when computing the distance between an object and a candidate image. Or, for a given candidate image, a distance/fit to the current image and a distance/fit to a given object can be combined to compute an overall distance/fit for the given object, and the closest (best fitting) image is selected.

Figure 5:
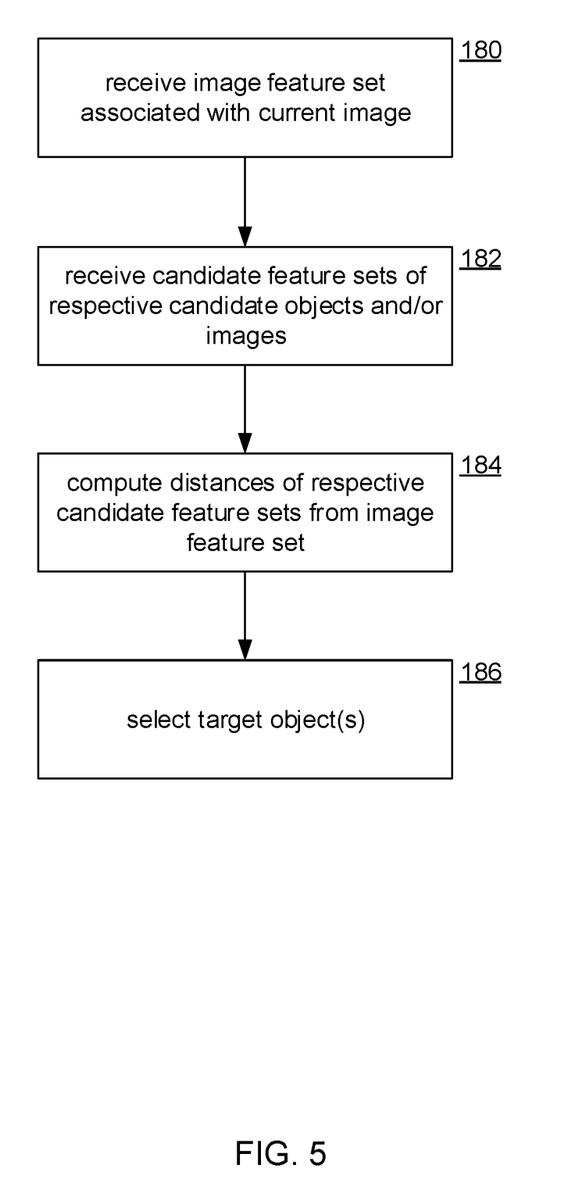
FIG. 5 shows a process for configuring image hotspots.

FIG. 5 shows a process for configuring image hotspots. At step 180, for a current image currently or about to be displayed, an image feature set is received. The feature set, or feature vector, may be derived on the local host or at a remote image processing service. At step 182, the process receives candidate features sets or vectors of candidate objects recognized in the current image. As noted above, the features may be a combination of image-derived information, features of the real-world things the image objects portray, and so forth. At step 184, distances, fits, or scores of the feature sets are computed relative to the feature set of the current image and/or context data. These measures indicate how relevant each object is to the current image, the user, recent activity of the user, and/or other images that are available to be viewed. At step 186, the objects whose features sets have the highest scores or are closest to the selection criteria are selected for augmentation. Selection of images are to be linked to objects' hotspots can be performed in similar fashion.

Figure 6:
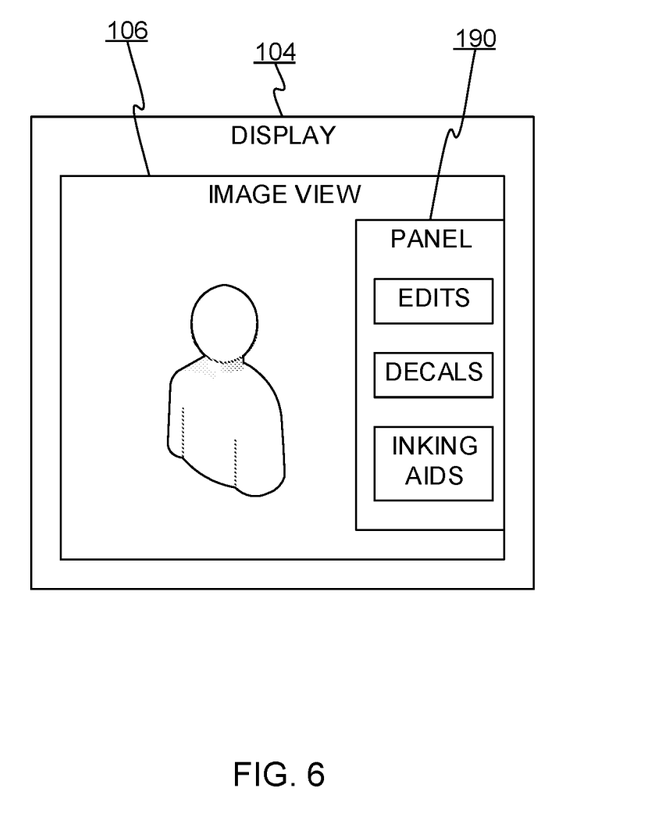
FIG. 6 shows an embodiment for augmenting an image without hotspots.

FIG. 6 shows an embodiment for augmenting an image without hotspots. In this embodiment, a tool panel 190 is added to or abuts the image view 106. The currently displayed image may be analyzed, and elements, attributes, or objects are recognized or identified. However, rather than overlaying hotspots on the currently displayed image, the tool panel 190 provides interactive enhancements based on the analysis of the current image. Operations invokable via the tool panel 190 may target objects or features identified in the current image. For example, faces, face features, things, etc. may be identified as targets for operations invoked from the tool panel 190. The objects or features may be identified and selected as described above in relation to hotspot augmentation. The objects or features become active in the image as know image locations exposed to the tool panel 190.

Operations invoked from the tool panel 190 may be enabled that target the objects or features of the current image. For example, if edit tools are provided, known basic image edits can be targeted to select locations of the image. If graphic stickers or decals are provided by the tool panel, the stickers or decals can be added to features of the image. For instance, if face features such as eyes and mouth have been identified in the image, decals can be dragged to the corresponding locations, dropped, and automatically placed on the image (or incorporated into the image) at the locations of the corresponding image objects or features. Decals, stickers, or the like may have multiple features to map to multiple objects in the image, in which case the decal, sticker, or the like, when dropped to the image, may be automatically scaled and rotated to align with the objects or features in the image. If a mouth and eyes have been located in the image, for example, a decal with pre-configured mouth and eye locations can be fitted to the mouth and eye locations in the image.

The set of operations that are available and/or the set of graphics (e.g., decals or stickers) can be determined based on the image, user, and/or context data discussed above. For instance, if the image is determined to be associated with a holiday (e.g., by date, season, detected image attributes, etc.), labels such as "Happy Halloween" or "Happy New Year" might be made available. If the image is determined to be associated with a Spring holiday, a rabbit graphic might be presented. Similarly, if faces in the image have been recognized, labels of the names associated with the faces may be made available for adding to the image. If the image is determined to portray a sunny day, a sunglass decal can be made available.

If inking tools are available, inking operations can similarly be guided by or anchored to image features recognized through the image analysis phase.

The tools that are to be made available, where hotspots are added, and what information is linked to hotspots, can also be tailored to suit a current operation mode of the image viewer application. If there are modes such as an editing mode, a viewing mode, and a browsing mode, any of the inventive aspects mentioned above can be adjusted accordingly. One way to do so is to include the current mode as a feature in the feature space used for object selection, linked-to image selection, tool selection, etc.

Figure 7:
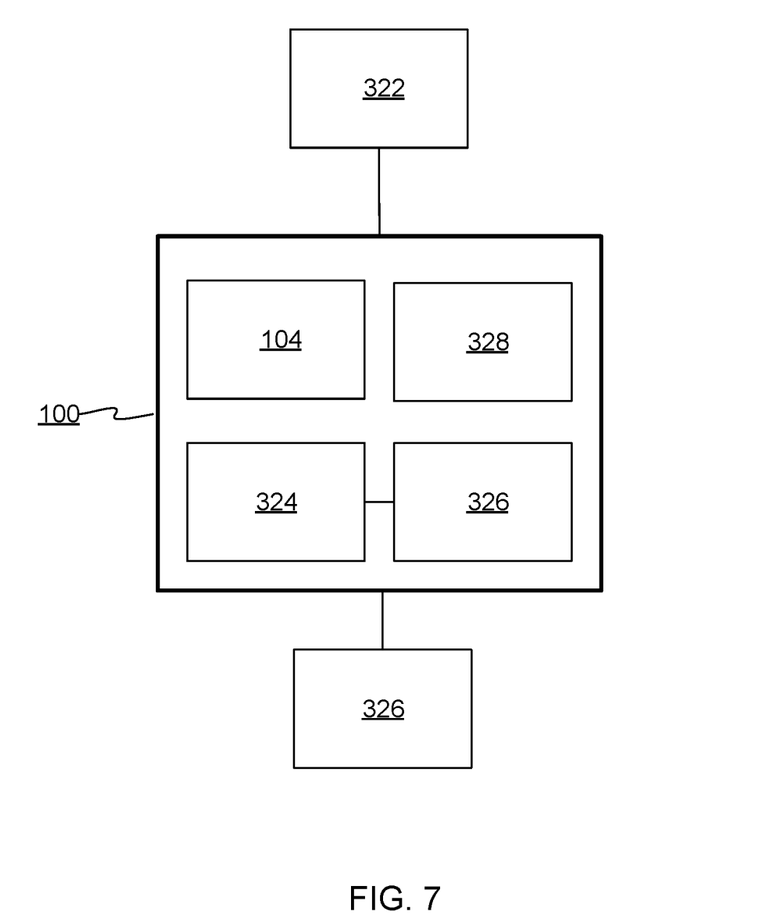
FIG. 7 shows details of a computing device on which embodiments may be implemented.

FIG. 7 shows details of the computing device 100 on which embodiments described above may be implemented. The computing device 100 is an example of a client/personal device or backend physical (or virtual) server devices that may perform various (or perhaps most) of the processes described herein. The technical disclosures herein will suffice for programmers to write software, and/or configure reconfigurable processing hardware (e.g., field-programmable gate arrays (FPGAs)), and/or design application-specific integrated circuits (ASICs), etc., to run on the computing device 100 (possibly via cloud APIs) to implement the embodiments described herein.

The computing device 100 may have one or more displays 104, a camera (not shown), a network interface 324 (or several), as well as storage hardware 326 and processing hardware 328, which may be a combination of any one or more: central processing units, graphics processing units, analog-to-digital converters, bus chips, FPGAs, ASICs, Application-specific Standard Products (ASSPs), or Complex Programmable Logic Devices (CPLDs), etc. The storage hardware 326 may be any combination of magnetic storage, static memory, volatile memory, non-volatile memory, optically or magnetically readable matter, etc. The meaning of the term "storage", as used herein does not refer to signals or energy per se, but rather refers to physical apparatuses and states of matter. The hardware elements of the computing device 100 may cooperate in ways well understood in the art of machine computing. In addition, input devices may be integrated with or in communication with the computing device 100. The computing device 100 may have any form-factor or may be used in any type of encompassing device. The computing device 100 may be in the form of a handheld device such as a smartphone, a tablet computer, a gaming device, a server, a rack-mounted or backplaned computer-on-a-board, a system-on-a-chip, or others.

Embodiments and features discussed above can be realized in the form of information stored in volatile or non-volatile computer or device readable media. This is deemed to include at least media such as optical storage (e.g., compact-disk read-only memory (CD-ROM)), magnetic media, flash read-only memory (ROM), or any current or future means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method performed by a computing device comprised of a display, processing hardware, and storage hardware, the method comprising:
   executing an application that accesses a set of images stored on the storage hardware and displays a user interface on the display, the user interface comprising an image display region that displays a rendering of a currently selected image selected from among the images in the set of images, wherein the currently selected image is the only image that is displayed in the image display region;
   performing an augmentation process each time the currently selected image changes, the augmentation process comprising:
      providing the currently selected image to an image analysis module, the image analysis module recognizing objects in the currently selected image and determining locations of portions of the currently selected image that correspond to the objects, respectively;
      automatically selecting one of the objects, determining a class of the object, searching the set of images for images of the same class to find a related image, and adding a hotspot to the image according to the determined location of the portion of the image corresponding to the selected object, the hotspot comprising an interactive user interface element, wherein the hotspot is linked to the related image; and
   responding to a user input directed to the hotspot that activates the hotspot by, based on the hotspot link to the related image, setting the related image as the currently selected image which causes displaying of only the related image in the image display region and which causes performance of the augmentation process with respect to the new currently selected image.

2. A method according to claim 1, wherein the hotspot comprises a graphic object that is displayed when initially added to the image and/or based on a user input directed to the image, and wherein the hotspot is undisplayed responsive to determining that an undisplay condition has been satisfied.

3. A method according to claim 2, wherein the displaying and undisplaying the hotspot comprises changing an alpha-blend ratio of the graphic object and the image.

4. A method according to claim 1, wherein each object has one or more features, the method further comprising:
   applying a ranking algorithm to the features of the objects to rank the objects; and
   selecting the object based on its rank.

5. A method according to claim 1, wherein the information related to the object is selected based at least in part on a current context associated with the image.

6. A method according to claim 5, wherein the context comprises history of user activity, metadata associated with images stored on the computing device, metadata about a user operating the application, metadata associated with images previously displayed by application, and/or indicia of objects identified in other images stored on the computing device.

7. A method according to claim 1, wherein the information associated with the hotspot comprises another image in the set of images, and wherein the method further comprises:

scoring images in the set of images, the scored images including the other image; and selecting the other image based on its score.

8. A method according to claim 7, further comprising responding to activation of the hotspot by displaying the other image in the user interface.

9. A computing device comprising processing hardware, storage hardware, and a display, the storage hardware storing instructions configured to cause the processing hardware to perform a process comprising:

accessing a set of images stored on the storage hardware and displaying a user interface on the display, the user interface comprising an image display region displaying only a rendering of a currently selected image that is currently selected from the set of images, wherein the currently selected image is the only image that is displayed in the image display area;

whenever a different image becomes the currently selected image, performing an augmentation process comprising:

displaying only the currently selected image in the image display area;

performing image analysis on the currently selected image to recognize objects in the currently selected image and determine respective locations in the currently selected image of the objects;

obtaining metadata items based on the image analysis and/or a context associated with the currently selected image;

automatically determining which of the objects are to be augmentation targets;

based on the metadata items, determining (i) which objects are to be augmentation targets and/or (ii) which targets images in the set of images to associate with the augmentation targets, respectively, wherein each augmentation target has a respectively selected target image;

adding hotspots only to locations in the image that correspond to the objects determined to be augmentation targets, wherein the hotspots comprises respective links to the respective target images; and responding to activation of an added hotspot, by a user input directed to the hotspot, by changing the currently selected image to be the target image that is linked to the activated hotspot, the changing the currently selected image causing the augmentation process to be performed with respect to the new currently selected image.

10. A computing device according to claim 9, wherein the objects comprise persons, wherein the image analysis is performed by a face recognition algorithm, and wherein the metadata items comprise identities of the objects determined by applying the face recognition to the image.

11. A computing device according to claim 9, the process further comprising providing a user interface element configured to respond to inputs directed thereto to perform operations on the image.

12. A computing device according to claim 11, wherein when an operation is invoked via the user interface element, the operation is directed to a location in the image that corresponds to one of the locations of one of the objects.

13. A computing device according to claim 12, wherein the one of the objects is selected when invoking the one of the operations.

14. Computer storage hardware storing information configured to cause processing hardware of a computing device to perform a process, the process comprising:

accessing a set of images stored by the storage hardware;

displaying a user interface that enables interactive recursive navigation of the images in the set of images, the user interface comprising an image view area where a current image selection is displayed, the current image selection comprising whichever image is currently selected from among the images in the set of images for display in the image view area, wherein the current image selection repeatedly changes to different images in the set of images;

each time the current image selection changes to a different image, performing an augmentation process comprising:

the image view area is updated to display the current image selection;

an object recognition algorithm is applied to the current image selection to recognize objects in the current image selection;

related images are selected, from the set of images, based on corresponding to the respectively recognized objects and hotspots linking to the related images, respectively, are added to locations in the view area that respectively correspond to locations of the objects in the currently selected image; and responding to activation of a hotspot responsive to a user input by causing the related image linked to the hotspot to become the currently selected image and performing the augmentation process on the new currently selected image, the performing the augmentation process including replacing the previous currently selected image in the image view area with only the new currently selected image.

15. Computer storage hardware according to claim 14, wherein the new image comprises a graphic that is added to the display of the image.

16. Computer storage hardware according to claim 15, wherein the graphic is added to the display of the image based on a location of the hotspot and/or the object associated with the hotspot.

17. Computer storage hardware according to claim 16, wherein the graphic is selected to become available for interactive selection from the user interface based on an attribute of the image determined by the object recognition algorithm.

18. Computer storage hardware according to claim 17, wherein an object is selected for receiving a hotspot based on a property of another image in the set of images.

* * * * *